Patented Nov. 3, 1925.

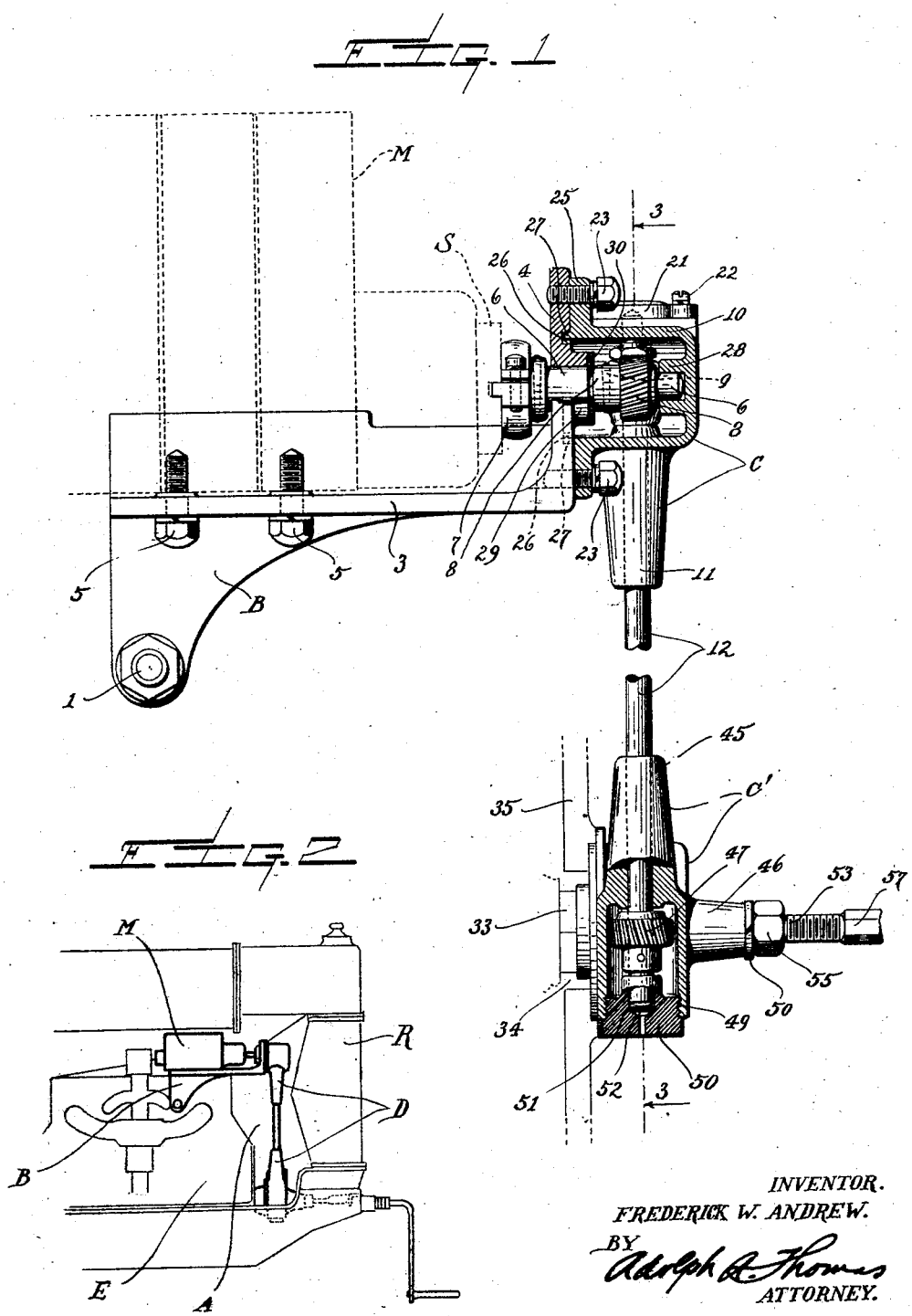

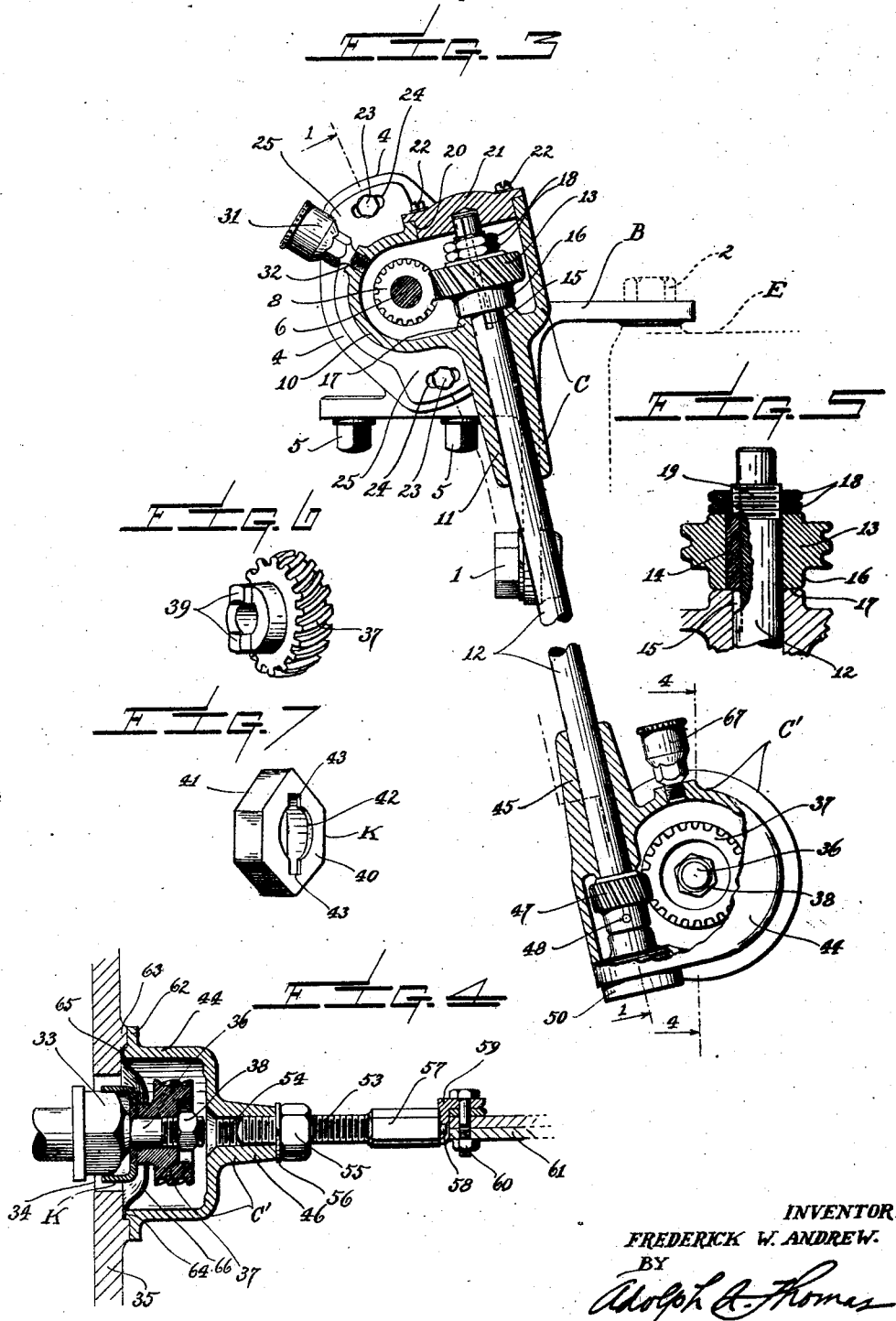

1,559,537

UNITED STATES PATENT OFFICE.

FREDERICK W. ANDREW, OF BROOKLYN, NEW YORK, ASSIGNOR TO EISEMANN MAGNETO CORPORATION, OF BROOKLYN, NEW YORK, A CORPORATION OF NEW YORK.

MAGNETO DRIVING CONNECTION FOR GAS ENGINES.

Application filed September 30, 1922. Serial No. 591,482.

*To all whom it may concern:*

Be it known that I, FREDERICK W. ANDREW, a citizen of the United States, and a resident of the city of New York, borough of Brooklyn, county of Kings, and State of New York, have invented certain new and useful Improvements in Magneto Driving Connections for Gas Engines, of which the following is a specification.

My invention is for a new and improved driving connection between a gas engine and the associated ignition magneto for operating the latter from the engine shaft. The magneto drive of my invention is readily installed on gas-engine vehicles of existing types and is particularly applicable to vehicles, like tractors, that travel over rough and dusty places.

I provide a gear and shaft connection between the engine shaft and the magneto shaft. The gears are enclosed in substantially dustproof casings, which also contain the necessary lubricant. This produces an easy running drive free from the injurious effects of dirt and water. To allow for the varying distances between engine shaft and magneto shaft, I provide an adjustable connection between the driving shaft and one of the gears thereon.

For the purpose of explaining the objects and advantages of my invention, I have shown in the accompanying drawings a form of magneto drive that has been successfully employed in actual practice, it being understood that this construction is merely illustrative of my invention. In these drawings, which form part of this specification.

Figure 1 is a side view of my new magneto drive as applied to a tractor, certain parts being shown in cross-section approximately on the broken line 1—1 of Fig. 3;

Fig. 2 is a diagrammatic view showing how the drive is installed on a tractor or similar vehicle in the space between the engine frame and the radiator;

Fig. 3 is a vertical cross-section approximately on line 3—3 of Fig. 1;

Fig. 4 is a cross-section approximately on line 4—4 of Fig. 3, showing how the lower gear casing is held against the engine frame;

Fig. 5 is a fragmentary view in cross-section showing the slidable connection between the drive shaft and the upper gear mounted thereon;

Fig. 6 is a detached perspective view of the spiral gear connected to the engine shaft; and Fig. 7 is a perspective view of my new and improved coupling cap for connecting the gear shown in Fig. 6 with the engine shaft.

Referring first to Fig. 2, there is an ignition magneto M mounted on a bracket B, which is conveniently fixed on the engine frame or casting E. In the space A between the engine frame and radiator R is installed my new driving connection, which I have indicated in this figure as a whole by D. We will now turn to the other figures for the detailed construction of this connection.

Bracket B is secured to the engine frame by bolts 1 and 2, as shown in Figs. 1 and 3, or in any other suitable manner. The bracket is provided with a horizontal shelf 3 and an upstanding plate 4. The shelf 3 is adapted to receive magneto M, which is held in place by bolts 5 or otherwise. It will be understood that the magneto M may be of any suitable construction, and so I have indicated it merely in a diagrammatic way.

Through plate 4 extends a shaft 6, which is connected to the armature shaft of the magneto through an impulse starter or similar device. In Fig. 1, the dotted lines S are intended to represent diagrammatically an impulse starter of any approved construction. In practice, I have used an impulse starter like that of my Patent No. 1,342,199, dated June 1, 1920, but any other form of impulse starter may be employed. As the function of impulse starters in ignition magnetos is well understood by those familiar with the gas-engine ignition art, I need not dwell upon this point any longer. So it is enough to say that shaft 6 is at its inner end provided with a suitable coupling 7 for connecting it with impulse starter S. For the structural details of coupling 7, I refer to my Patent No. 1,352,864, dated September 14, 1920, but any other form of coupling may be employed. Since the shaft 6 is thus operatively connected to the armature shaft of magneto M and forms in effect a continuation of the armature shaft, I will hereinafter refer to shaft 6 as the magneto shaft. On the projecting end of shaft 6 is secured a spiral gear 8. Any suitable means may be used for rigidly fixing gear 8 on shaft 6 so that the two will rotate together. In Fig. 1, there is a pin 9 passing through hub 8' of gear 8 into shaft 6.

To the upstanding plate 4 of bracket B is secured a casing, indicated as a whole by C. As shown in Figs. 1 and 3, casing C comprises a cylindrical or cover portion 10 and a hollow tubular extension 11, which is roughly speaking, tangential to the cylindrical portion 10. Casing C may conveniently be formed in a single casting. The extension 11 constitutes a journal bearing for the upper portion of a driving shaft 12. On the upper end of shaft 12 is fixed a spiral gear 13 arranged in mesh with spiral gear 8, as shown in Fig. 3. It is preferable that gear 13 be slidably adjustable relatively to shaft 12. For this purpose, the gear 13 is provided with a spline 14 arranged to engage in a groove or slot 15 of shaft 12. This is best shown in Fig. 5. Gear 13 is formed with a hub 16 adapted to rest on or be contiguous to the circular flange 17 of casting C when gear 13 is in proper mesh with gear 8. Gear 13 is held in place by nuts 18, which engage screw threads 19 at the upper end of shaft 12. It will be seen that in this way gear 13 is readily adjusted axially on shaft 12 and clamped in adjusted position. Casing C is provided with an opening 20 substantially in line with shaft 12 in order to permit gear 13 to be inserted or adjusted on shaft 12, or removed therefrom when desired. Opening 20 is closed by a suitable cover 21 held in place by screws 22 or otherwise.

Casing C is preferably attached to the upstanding plate 4 of bracket B in such a manner that it can be readily adjusted into the correct angular position. This adjustment may be accomplished in various ways. In the drawings I have shown bolts 23 passing through arcuate slots 24 in the flange 25 of casing C. By simply loosening the bolts 23, the entire casing may be turned into proper position and then fastened. To assist in centering casing C on bracket plate 4, I provide the latter with a circular groove or recess 26 arranged to receive a correspondingly shaped flange or shoulder 27 on casing C. This is indicated in Fig. 1. Also, if desired, casing C may be formed with a bearing hub 28 for receiving the outer end of shaft 6. Plate 4 may be formed with a hub 29 to give a wider bearing for shaft 6. A suitable washer 30 may be interposed between hub 29 and hub 8' of gear 8. It will thus be seen that the magneto shaft 6 has ample bearing surface to stand the essential strains of operation. Lubricating oil or grease is fed into casing C through a cup 31 screwed at 32 into the casing.

In the particular embodiment herein illustrated, the projecting outer end of the cam shaft of the engine (which I may conveniently call the engine shaft) is provided with a nut 33, which is accessible through an opening 34 in the front wall 35 of the engine frame. This is best shown in Fig. 4. Broadly speaking, nut 33 is a polygonal member. The engine shaft projects beyond the nut 33 in the form of a screw-threaded extension 36. In a type of vehicle known in the trade as the Fordson tractor, the extension 36 normally carries a timer. In applying my invention to such a vehicle, the only change necessary is a removal of this timer, which is quickly and easily done. With the timer removed, shaft 36 is ready to receive a spiral gear 37 which is clamped in place by a nut 38 or otherwise. As shown in Fig. 4, the nut 38 is in a recess formed in the outer face of gear 37, thereby rendering the gear mounting more compact. For the sake of brevity, I will hereinafter refer to the extension 36 as the engine shaft. I have devised a novel means for coupling spiral gear 37 to nut 33. As best shown in Fig. 6, gear 37 is formed with one or more lugs 39. Between nut 33 and gear 37 is a coupling member in the form of a cap, indicated as a whole by K, as best shown in Fig. 7. Cap K may conveniently be stamped out of a single piece of sheet metal, and comprises a disk 40 from which extends axially a polygonal flange 41. Disk 40 is provided with an opening 42 and one or more slots 43. The shape of flange 41 is such that it fits snugly over the correspondingly shaped nut 33. To connect gear 37 with nut 33, it is therefore only necessary to slip the gear on shaft 36 until the lugs 39 enter the slots 43 of cap K. The nut 38 is then tightened to hold the parts in fixed operative position.

The spiral gear 37 is enclosed in a casing indicated as a whole by C', and comprising a cylindrical cover portion 44, a bearing extension 45 and a screw-threaded axial hub 46. The extension 45 is formed substantially tangential with respect to the main body of the casing and is adapted to receive the lower portion of driving shaft 12, as shown in Fig. 3. The spiral gear 47 is secured to the lower end of shaft 12 by a pin 48, or otherwise, in position to be in mesh with spiral gear 37. Casing C' is formed with a screw-threaded opening 49 substantially in line with the shaft bearing 45 and adapted to be closed by a screw-threaded cap 50, as shown in Fig. 1. This cap has an opening 51 for receiving the lower end of shaft 12 and it may also carry a thrust washer 52.

Casing C' is held in place by a screw rod 53 adapted to enter the screw-threaded opening 54 in the hub 46 of casing C'. A nut 55 and split washer 56 may be used to prevent loosening of the parts. The screw rod 53 has a nut portion 57 from which projects a lug 58 arranged to enter a hole in an angle piece 59 secured by a bolt 60 to a flange 61 at the base of the radiator R. It may be stated that in the Fordson tractor the flange 61 is a permanent part of the vehicle and I make use of it for the purpose stated. Of course, it will be understood that, in the broader aspect of my invention, the opposite supports 35 and 61, as shown in Fig. 4, are to be simply considered as any suitable rigid parts of a gas engine structure.

It will be seen that by turning the screw bar 53 in the right direction (as by applying a wrench to the nut portion 57), casing C' is moved tightly against the wall 35 and held clamped in that position. Casing C' may be provided with a flange 62 shaped to fit against a corresponding flange 63 on wall 35. To assist in centering casing C' on the engine wall 35, the casing may be provided with a circular shoulder 64 arranged to enter a circular recess 65 in wall 35, as shown in Fig. 4. If desired, a dished cover 66 may be interposed between the coupling cap K and the gear 37. This cover may conveniently be clamped in place by the shoulder 64 of casing C'. The purpose of cover 66 is to prevent oil in the crank case of the engine from entering the casing C' and also to keep the lubricating grease within the casing. Cover 66 may conveniently be stamped out of sheet metal. Casing C', like casing C, preferably has a grease cup 67 for lubricating gears 37 and 47.

In assembling the driving connection between the engine shaft and the magneto shaft, the following procedure may be had: After the spiral gear 37 has been coupled to the nut 33, as previously explained, the lower casing C' is placed over the gear 37 until gear 47 of the driving shaft is in mesh with gear 37, whereupon the screw 53 is tightened to clamp the casing rigidly in position. It may be noted that when this is done, the upper gear 13 is not on the shaft 12. The next thing to do is to screw the upper casing C in position on the bracket plate 4. Then, gear 13 is slipped through opening 20 in casing C on to shaft 12. After gear 13 is properly in mesh with the companion gear 8, the nuts 18 are screwed down tight. Thereupon cover 20 is screwed in position.

It will be seen from Fig. 3 that any variations in the distance between the engine shaft 36 and the magneto shaft 6 are taken care of by means of the slidable gear 13. This adjustable feature is very desirable, because, in installing magnetos on engines of different types, or even on different engines of the same construction, there is bound to occur some variation in the exact distance between the engine shaft and the magneto shaft, and this variation is taken care of by the axial adjustment of the spiral gear 13. Obviously, this adjustable feature might be applied to the lower spiral gear 37, or the shaft 12 may consist of two adjustable sections, but at the present time I prefer to have the upper gear 13 adjustable. When I speak of the parts C and C' as casings, I do not use the word in its restrictive sense to mean an entirely close housing, but rather to indicate suitably chambered supports or brackets.

It will be evident from the foregoing description that I have provided a simple and efficient driving connection between the shaft of a gas engine and the shaft of the associated magneto. The moving parts are enclosed in substantially dustproof casings, whereby the smooth and easy running of the parts is insured for a long time. There are no delicate parts to break and nothing to get out of order after the parts have once been properly adjusted. Moreover, it is a very simple and easy matter to install this driving connection on vehicles of existing types. Although I have shown and described a specific construction, it is clear that the main features of my invention may be mechanically carried out in other ways than herein set forth.

I claim as my invention:

1. In combination with a gas engine, a bracket fixed on the engine frame and having an upstanding plate, a magneto mounted on said bracket in such position that the magneto shaft projects through said plate, a gear on the projecting end of the magneto shaft, a one-piece casing secured to said plate, said casing comprising a hollow body portion with a tubular extension projecting therefrom, said hollow body portion forming a chamber enclosing said gear on the magneto shaft, a second gear connected to the engine shaft, a casing secured over said second gear and having a one-piece tubular extension in line with and projecting toward the tubular extension of said first casing, a driving shaft rotatably mounted in said tubular extensions and projecting at its ends into said casings, and a pair of gears on said driving shaft within said casings and in mesh with the other two gears.

2. In combination with a gas engine, a bracket fixed on the engine frame above the engine shaft and having an upstanding plate, a magneto mounted on said bracket in such position that the magneto shaft projects through said plate, a gear on the projecting end of the magneto shaft, an upper casing secured to said plate, said casing comprising a hollow body portion and a tubular extension projecting therefrom, said hollow body portion forming a chamber enclosing said gear on the magneto shaft the upper wall of said chamber having an opening in line with said tubular extension, a removable cover for said opening, a second gear connected to the engine shaft, a lower casing secured over said second gear and having a tubular extension in line with and projecting toward the tubular extension of said first casing, said casings being rotatably adjustable independently of each other, a driving shaft journalled in said tubular extensions and projecting at its ends into said casings, a gear on said driving shaft in the lower casing in mesh with the gear of the engine shaft, a second gear on the driving shaft in the upper casing in mesh with the gear of the magneto shaft, said second gear on the driving shaft being slidable on said shaft and movable into and out of position through the opening in the upper casing, and means for securing said second driving gear in adjusted position on the driving shaft.

3. In combination with a gas engine, a bracket fixed on the engine frame, a magneto mounted on said bracket, a gear on the projecting end of the magneto shaft, a one-piece casing secured to said bracket, said casing comprising a hollow body portion with a tubular extension projecting therefrom, said hollow body portion forming a chamber enclosing said gear on the magneto shaft, a bearing formed integral in the end wall of the body portion of said casing for receiving the outer end of the magneto, a second gear connected to the engine shaft, a casing secured over said second gear and having a one-piece tubular extension in line with and projecting toward the tubular extension of said first casing, a driving shaft rotatably mounted in said tubular extensions and projecting at its ends into said casings, and a pair of gears on said driving shaft within said casings and in mesh with the other two gears.

4. In combination with a gas engine, a bracket fixed on the engine frame and having an upstanding plate, a magneto mounted on said bracket in such position that the magneto shaft projects through said plate, a gear on the projecting end of the magneto shaft, a casing secured to said plate, said casing comprising a hollow body portion and a tubular extension projecting therefrom, said hollow body portion forming a chamber enclosing said gear on the magneto shaft, a second gear connected to the engine shaft, a casing secured over said second gear and having a tubular extension in line with and projecting toward the tubular extension of said first casing, a driving shaft rotatably mounted in said tubular extensions and projecting at its ends into said casings, a pair of gears on said driving shaft within said casings and in mesh with the other two gears, and means whereby the gear in the upper casing is slidable within said chamber on the driving shaft.

5. In combination with a gas engine, a polygonal member fixed on the engine shaft near the projecting outer end thereof, a gear on the projecting end of said shaft, means for coupling said gear to said member, said means being slidable on said shaft into and out of engagement with said member, a magneto associated with the engine, and driving connections between said gear and the magneto.

6. In combination with a gas engine, a polygonal member fixed on the engine shaft near the projecting outer end thereof, a gear on the projecting end of said shaft, a coupling element on said shaft between said member and said gear, said element having means for engaging said member and means for engaging said gear, whereby said gear is operatively connected to said member, a magneto associated with the engine, and driving connections between said gear and the magneto.

7. In combination with a gas engine, a polygonal member fixed on the engine shaft near the projecting outer end thereof, a gear on the projecting end of said shaft, a lug on said gear, a cap arranged between said gear and said member, said cap having a flange for gripping the polygonal surface of said member and having a slot for engaging said lug, whereby said cap operatively connects said gear to said shaft, a magneto associated with the engine, and driving connections between said gear and the magneto.

8. As a new article of manufacture for use in driving connections between gas engines and magnetos, a metallic coupling cap formed with a polygonal interior chamber constructed to fit snugly over the polygonal surface of a nut or similar polygonal member, substantially as and for the purposes specified.

9. In combination with a gas engine, a nut fixed on the cam shaft near the projecting end thereof, a gear on said shaft, a coupling cap fitting over said nut so as to rotate therewith, means for operatively connecting said gear with said cap, a magneto associated with the engine, and driving connections between said gear and said magneto.

10. As a new article of manufacture for use in driving connections between gas engines and magnetos, a coupling cap formed of a single piece of sheet metal having a slotted disk portion and a polygonal chamber constructed to fit snugly over the polygonal surface of a nut or similar polygonal member, substantially as and for the purposes specified.

11. As a new article of manufacture for use in driving connections between gas engines and magnetos, a one-piece gear comprising a toothed body portion from one face of which axially projects a bearing hub, and a pair of lugs extending axially from the end of said hub, substantially as and for the purposes specified.

12. As a new article of manufacture for use in driving connections between gas engines and magnetos, a one-piece gear comprising a toothed body portion from one face of which axially projects a bearing hub, and a pair of lugs extending axially from the end of said hub, the opposite face of said body portion being recessed, substantialy as and for the purposes specified.

13. In an automotive vehicle operated by a gas engine, a gear connected to the engine shaft, a casing arranged over said gear and having a screw-threaded extension in substantially axial alignment with the engine shaft, a brace rod arranged in substantially axial alignment with the engine shaft and having a screw-threaded end engaging said screw-threaded extension of the casing, the other end of said brace rod bearing against a fixed part of the engine or vehicle, whereby said rod holds said casing rigidly in place against the engine frame and permits rotary adjustment of the casing, a driving shaft mounted at its lower end in said casing and having a gear in mesh with the gear of the engine shaft, a magneto associated with the engine, and means for operatively connecting said driving shaft with the magneto.

14. In an automotive vehicle operated by a gas engine, a gear on the cam shaft of the engine, a casing arranged over said gear and bearing against the engine frame, said casing being provided with a projection in substantially axial alignment with the cam shaft, a brace rod supported at one end in substantially axial alignment with the cam shaft and at the other end engaging said projection of the casing, whereby said casing is rigidly braced against the engine frame, a driving shaft mounted at its lower end in said casing and having a gear in mesh with the gear of the engine shaft, a magneto associated with the engine, and means for operatively connecting said driving shaft with the magneto.

15. In an automotive vehicle operated by a gas engine, a gear on the cam shaft of the engine, a casing arranged over said gear and bearing against the engine frame, said casing being provided with a projection in substantially axial alignment with the cam shaft, a brace rod supported at one end in substantially axial alignment with the cam shaft and at the other end engaging said projection of the casing, whereby said casing is rigidly braced against the engine frame, a driving shaft mounted at its lower end in said casing and having a gear in mesh with the gear of the engine shaft, a magneto associated with the engine, means for operatively connecting said driving shaft with the magneto, and means whereby said rod may be adjusted to permit rotary adjustment of said casing.

16. In an automotive vehicle operated by a gas engine, a gear on the cam shaft of the engine a casing arranged over said gear and bearing against the engine frame, said casing being provided with a projection in substantially axial alignment with the cam shaft, a brace rod supported at one end in substantially axial alignment with the cam shaft and at the other end engaging said projection of the casing, whereby said casing is rigidly braced against the engine frame, a driving shaft mounted at its lower end in said casing and having a gear in mesh with the gear of the engine shaft, a magneto associated with the engine, means for operatively connecting said driving shaft with the magneto, and cooperating means on said casing and the engine frame for centering said casing with respect to the cam shaft.

17. In an automotive vehicle operated by a gas engine, a gear connected to the engine shaft, a casing arranged over said gear and having a screw-threaded extension in substantially axial alignment with the engine shaft, a fixed support spaced from said casing, a brace rod arranged in substantially axial alignment with the cam shaft, one end of said rod engaging said support, the other end of said rod being screw-threaded and engaging said screw-threaded projection, whereby said rod rigidly braces said casing against the engine frame, means whereby said rod is adjustable to exert the required pressure against said casing, means for locking the rod in adjusted position shaft mounted at its lower end in said casing and having a gear in mesh with the gear of the engine shaft, a magnet associated with the engine and means for operatively connecting said driving shaft with the magneto.

18. In combination with a gas engine, a bracket mounted on the engine frame above the engine shaft, a magneto fixed to said bracket, a shaft support secured to said bracket, means permitting rotary adjustment of said support, a second shaft support held to the engine frame at the projecting end of the engine shaft, a bracing rod supported substantially in axial alignment with the engine shaft and engaging said second support to hold the same rigidly clamped against the engine frame, said rod permitting rotary adjustment of said second support, a driving shaft journalled in said supports, and gears for operatively connecting said driving shaft at its lower end to the engine shaft and at its upper end to the magneto shaft.

19. As a new article of manufacture for use in driving connections between gas engines and magnetos, a casting comprising a substantially cylindrical cap or cover portion open at one end and having a screw-threaded axial extension at the other end, said open end having an annular flange or shoulder and the cylindrical wall of said cap portion being provided with a substantially tangential bearing hub, substantially as and for the purposes specified.

20. As a new article of manufacture for use in driving connections between gas engines and magnetos, a casting comprising a substantially cylindrical cap or cover portion open at one end and having a screw-threaded axial extension at the other end, the cylindrical wall of said cap portion being provided with a substantially tangential bearing hub, substantially as and for the purposes specified.

21. In combination with a gas engine, a bracket mounted on the engine frame above the engine shaft, a magneto fixed on said bracket, a shaft support secured to said bracket, a second support secured to the engine frame at the projecting end of the engine shaft, a driving shaft journalled in said supports, gears for operatively connecting said driving shaft end to the magneto shaft, one of said gears being axially movable in its support on said shaft, and means for locking the last-named gear in its axially adjusted position.

22. In combination with a gas engine, a magneto supported in proper relation to the engine, a casing mounted over the projecting end of the magneto shaft and having a tubular extension, a second casing mounted over the projecting end of the cam shaft and having a tubular extension in line with and projecting toward said first-named tubular extension, a drive shaft journalled in said aligned extensions and projecting at its ends into said casings, gears on the ends of said shaft in said casings, one of said gears being axially adjustable within its casing, means for locking the axially adjusted gear in position on said shaft, gears on the magneto shaft and the engine shaft respectively in mesh with said gears on the drive shaft, means for permitting rotary adjustment of the first casing, and means for permitting independent rotary adjustment of the second casing.

23. In combination with a gas engine, a magneto mounted adjacent the engine in operative relation thereto, a gear on the projecting end of the magneto shaft, a one-piece casing into which said projecting end of the magneto shaft extends, said casing comprising a hollow body portion with a tubular extension projecting therefrom, said hollow body portion forming a chamber enclosing said gear on the magneto shaft, a second gear connected to the engine shaft, a casing secured over said second gear and having a one-piece tubular extension in line with and projecting toward the tubular extension of said first casing, a driving shaft rotatably mounted in said tubular extensions and projecting at its ends into said casings, and a pair of gears on said driving shaft within said casings and in mesh with the other two gears.

FREDERICK W. ANDREW.